United States Patent
Granstam et al.

(10) Patent No.: US 6,842,629 B1
(45) Date of Patent: Jan. 11, 2005

(54) ARRANGEMENT IN A RADIO SYSTEM

(75) Inventors: Bo Granstam, Källered (SE); Bengt Johansson, Göteborg (SE); Magnus Olsson, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 305 days.

(21) Appl. No.: 10/009,778
(22) PCT Filed: Jun. 16, 2000
(86) PCT No.: PCT/SE00/01282
§ 371 (c)(1),
(2), (4) Date: Mar. 11, 2002
(87) PCT Pub. No.: WO00/79694
PCT Pub. Date: Dec. 28, 2000

(30) Foreign Application Priority Data

Jun. 18, 1999 (SE) .............................................. 9902338

(51) Int. Cl.[7] .................................................. H04B 1/38
(52) U.S. Cl. ........................ 455/561; 455/500; 455/561; 455/562; 455/78; 455/80; 455/11.1; 375/211; 375/377

(58) Field of Search ................................. 455/500, 522, 455/561, 562, 78, 80, 562.1, 11.1; 375/211, 377

(56) References Cited

U.S. PATENT DOCUMENTS

| | | | |
|---|---|---|---|
| 5,652,765 A | * | 7/1997 | Adachi et al. ............... 375/211 |
| 5,701,595 A | | 12/1997 | Green, Jr. |
| 5,815,803 A | | 9/1998 | Ho et al. |
| 6,005,884 A | * | 12/1999 | Cook et al. ................. 375/132 |
| 6,125,109 A | * | 9/2000 | Fuerter ....................... 370/315 |

FOREIGN PATENT DOCUMENTS

GB  2322772 A  9/1998

* cited by examiner

*Primary Examiner*—Nay Maung
*Assistant Examiner*—Shaima Q. Aminzay
(74) *Attorney, Agent, or Firm*—Nixon & Vanderhye P.C.

(57) ABSTRACT

The present invention relates to an arrangement for connecting antennas to ports of a transceiver unit in a base station. By using two circulators and a four port sputter a more flexible small base station is attained. The arrangement provides, at a low extra cost, the capability of adding an auxiliary transceiver unit to the base station.

6 Claims, 2 Drawing Sheets

ARRANGEMENT IN A RADIO SYSTEM

This application is the U.S. national phase of international application PCT/SE00/01282, filed in English on Jun. 16, 2000, which designated the United States. PCT/SE00/01282 claims priority to Swedish application No. 9902338-4, filed on Jun. 18, 1999. The entire contents of these applications are incorporated herein by reference.

TECHNICAL FIELD OF THE INVENTION

The present invention relates to a base station arrangement, and in particular an arrangement for connecting first and second antennas to a transceiver unit in a base station.

DESCRIPTION OF RELATED ART

The rapidly increasing demand of mobile radio telephony services over the recent years has led to a fast growth of the number of base stations used in mobile systems. In particular, the number of small base stations, covering a relatively small area, called cell, has increased.

Such cells, sometimes called microcells or even picocells, serve to provide mobile telephony services at sites where the subscriber density is high.

Small base stations may, however, also be useful in rural areas where traffic intensity is low. Then the small base station is a cost effective solution for increasing the area covered by mobile radio telephony services. Then, of course, the geographic area covered by the base station may be relatively large.

Such a base station may involve a transceiver unit and two antennas. One antenna is used only to receive incoming RF signals, while the other antenna is used both to transmit and to receive RF signals.

A transceiver unit may then involve a receiver port that is connected to the antenna intended only for reception. The other antenna is connected to a duplex port, both transmitting and receiving RF signals. The antennas are spaced apart in order to achieve diversity. Such base stations are widely spread and can be found at numerous sites.

A problem encountered in such a base station is that it is difficult to increase its capacity. Of course, an auxiliary transceiver unit could possibly be connected to the same antennas by means of a combiner and some splitters. These coupling means, however, are relatively expensive and bulky, in particular the combiner.

Therefore, it is a more feasible approach to increase the capacity of the system by simply adding an extra base station, complete with a transceiver unit and two antennas.

Small base stations, however, are often used in aesthetically sensitive urban environments. In such environments it is difficult to find suitable base station locations.

SUMMARY OF THE INVENTION

An object of the present invention is to achieve a more flexible small base station arrangement, allowing the capacity of the base station to be more easily increased.

Another object is to obtain a cost-effective base station arrangement.

These objects are achieved in a base station arrangement having a first antenna and a second antenna. These antennas are to be connected to first and second ports of a transceiver unit. The first port is a duplex port and the second port is a receiver port. The arrangement involves two circulator units and a four port splitter unit.

A first circulator has a first port connected to the duplex port of the transceiver unit and a second port connected to the first antenna and a third port connected to a first port of the splitter unit. The transmission direction of the circulator is from the first port to the second port, from the second port to the third port and from the third port to the first port.

A second circulator has a first port connected to the second antenna and a second port connected to a second port of the splitter unit. This circulator is designed so that signals inputted at its first port are outputted at its second port only, signals inputted at its second port are outputted at a third port only, and signals inputted at said third port are outputted at its first port only.

The splitter unit has a third port connected to the receiver port of the transceiver unit and is designed so that signals inputted at its first port are outputted at its second and third ports. Signals inputted at its second port are outputted at its first ports and a fourth port.

This results in a neat, inexpensive and easily scalable arrangement. If an auxiliary transceiver unit is to be attached then its duplex port is simply connected to the third port of the second circulator and its receiver port to the fourth port of the splitter.

If on the other hand no auxiliary transceiver unit is needed then those ports of the second circulator and the splitter are terminated by matched resistive elements. Therefore such an arrangement allows a base station arrangement to be manufactured with the capability of adding an auxiliary transceiver unit with a very low extra cost. Thus, larger series can be attained, since fewer types of base stations are manufactured.

In a preferred embodiment the splitter unit is designed to split signals incoming at its first or second port unevenly in a degree compensating for the attenuation between two circulator ports. This allows standard type transceiver units to be effectively used without modifications.

In another preferred embodiment one transceiver unit is adapted for voice traffic and the other for packet data traffic. This means that new services can be added to the mobile telephony system at a site without requiring extensive changes of the base station.

Preferably, the splitter unit is a microstrip branchline splitter. This results in an arrangement that may be realised with inexpensive standard components.

DESCRIPTION OF PREFERRED EMBODIMENTS

Figure 1:
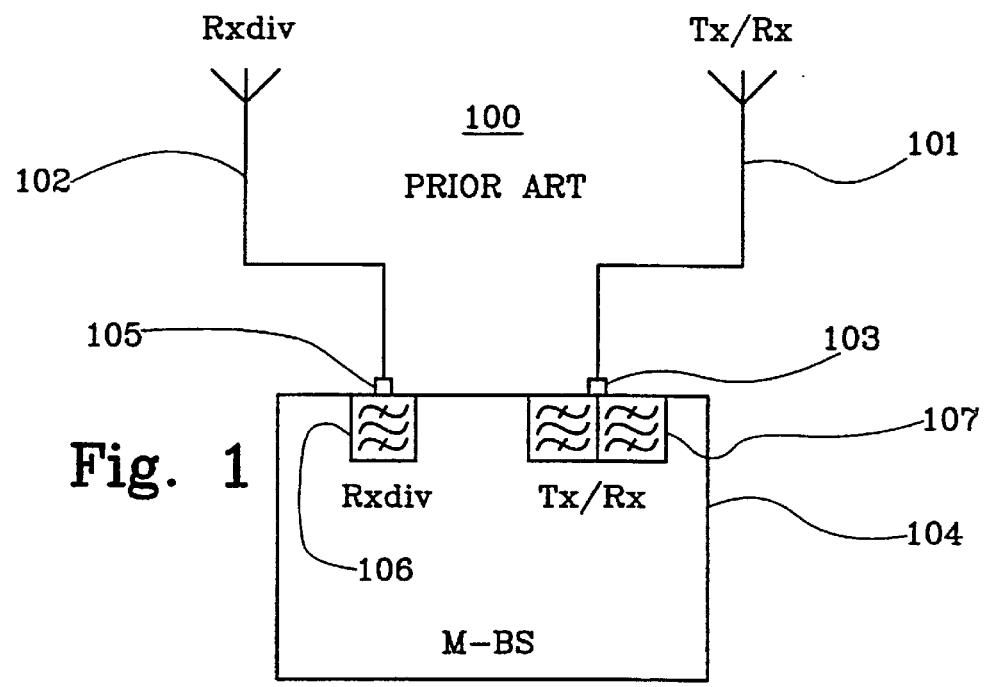
FIG. 1 illustrates, schematically, a small base station according to prior art.

FIG. 1 illustrates, schematically, a small base station according to prior art. The base station 100 then involves a first antenna 101, which is used both for transmitting and receiving radio signals and which therefore may be called a duplex antenna. A second antenna 102 is used as a receiver antenna only. These antennas are spaced apart in order to obtain diversity and thus reducing so-called Raleigh fading, as is well known in the art.

The first antenna is connected to a duplex port 103 of a transceiver unit 104. The second antenna is connected to a receiver port 105 of the transceiver unit 104. In this type of transceiver filter units are integrated. This means that the receiver port is provided with a bandpass filter 106 and that the duplex port is provided with a duplex filter 107. Optionally, a power amplifier for transmission and low noise amplifiers for reception may also be integrated. Such a transceiver unit is sometimes called a micro-base station (M-BS) and may then include all or most functionality required at a base station site, except antennas.

To add an auxiliary transceiver unit to this prior art arrangement would be a complicated operation. At least it would involve two splitters and a combiner. In commercial practice, however, this is not realistic. Instead an extra base station is normally set up, or as an alternative a full scale base station designed for multiple transceiver units is chosen in the first place.

Figure 2A:
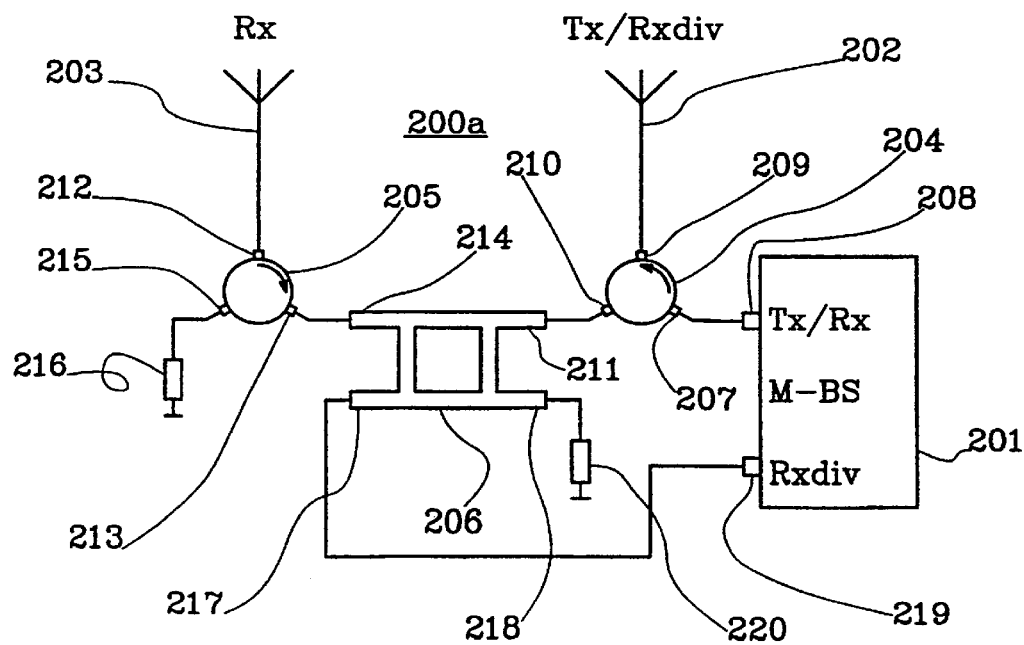
FIG. 2a illustrates, a small base station according to the invention, where one transceiver unit is attached.

FIG. 2a illustrates, a small base station 200a according to the invention, where only one transceiver unit 201 is attached. The arrangement then involves a first antenna 202, which is used as a duplex antenna and a second antenna 203, which in this case is used only for receiving radio frequency signals. The transceiver unit 201 may be of the same type as the transceiver unit 104 of FIG. 1. It thus contains the same types of filters (not shown).

The arrangement further involves a first circulator unit 204, a second circulator unit 205 and a four port splitter unit 206. The splitter unit 206 may, for instance, be a microstrip branchline splitter, which is a standard component. The first circulator unit 204 has a first port 207 connected to the duplex port 208 of the transceiver unit 201, a second port 209 is connected to the duplex antenna 202 and a third port 210 is connected to a first port 211 of the four port splitter unit 206. The circulator is a standard component with properties well known in the art. It is configured so that signals inputted at its first port 207 are outputted only at the second port 209, and with very low losses. Similarly, signals inputted at its second port 209 are outputted at the third port 210 and signals inputted at the third port 210 are outputted at the first port 207.

The second circulator unit 205 has a first port 212 connected to the receiver antenna 203. A second port 213 is connected to a second port 214 of the four port splitter unit 206. A third port 215 is connected to a first matched resistive element 216. The second circulator is configured so that signals inputted at its first port 212 are outputted only at the second port 213. Similarly, signals inputted at its second port 213 are outputted at the third port 215 and signals inputted at the third port 215 are outputted at the first port 212.

The four port splitter unit 206, which per se is well known in the art, is designed so that signals inputted at one of its ports are outputted at two other ports. In this case, if a signal is inputted at its first port 211 this signal is splitted and outputted at the second port 214 and at a third port 217. If those two ports 214, 217 are connected to the base station arrangement in a matched manner, no reflections will appear and consequently none of this signal energy will appear on a fourth port 218. Similarly, if a signal is inputted at the second port 214 this signal is splitted and outputted the first 211 and fourth port 218. The third port 217 of the four port splitter unit 206 is then connected to a receiver input 219 of the transceiver unit 201.

If, in the above described inventive arrangement, a signal is transmitted from the duplex port 208 of the transceiver unit 201 it is coupled to the first port 207 of the first circulator unit 204. Thus, it is outputted at the second port 209 of the first circulator 204 and coupled to the first antenna 202, where it is transmitted to the air interface.

If a radio frequency signal is received at the first antenna 202, it is inputted at the second port 209 of the first circulator unit 204. This signal is consequently outputted at the third port 210 of this circulator unit 204. The signal is then coupled to the first port 211 of the splitter unit 206, and therefore it is splitted and outputted at the second 214 and third 217 ports of this splitter. The signal outputted at the second port 214 of the splitter unit 206 is inputted at the second port of the second circulator unit 205. Thus it is outputted at the third port 215 of the second circulator unit 205, where it is terminated by means of the first matched resistive element 216. The signal that is outputted at the third port 217 of the splitter unit 206 is inputted to the second port 219 of the transceiver unit 201.

If a radio frequency signal is received at the second antenna 203, it is inputted at the first port 212 of the second circulator unit 205. This signal is consequently outputted at the second port 213 of this circulator unit 205. The signal is then coupled to the second port 214 of the splitter unit 206, and therefore it is splitted and outputted at the first 211 and fourth 218 ports of this splitter. The signal outputted at the first port 211 of the splitter unit 206 is inputted at the third port 210 of the first circulator unit 204. Thus, it is outputted at the first port 207 of the first circulator unit 204, where it is connected to the duplex port 208 of the transceiver unit 201. The signal that is outputted at the fourth port 218 of the splitter unit 206 is terminated by means of a second matched resistive element 220.

As is indicated in FIG. 2a, a part of the energy received at each antenna 202, 203 is wasted in the resistive elements 216, 220. This appears, at first sight, to be a drawback compared to the prior art system described in FIG. 1. It is, however, not difficult to compensate for this loss by increasing the signal processing capabilities of the transceiver unit. Since base stations are not normally depending on batteries, the extra power needed for this signal processing may easily be provided.

Figure 2B:
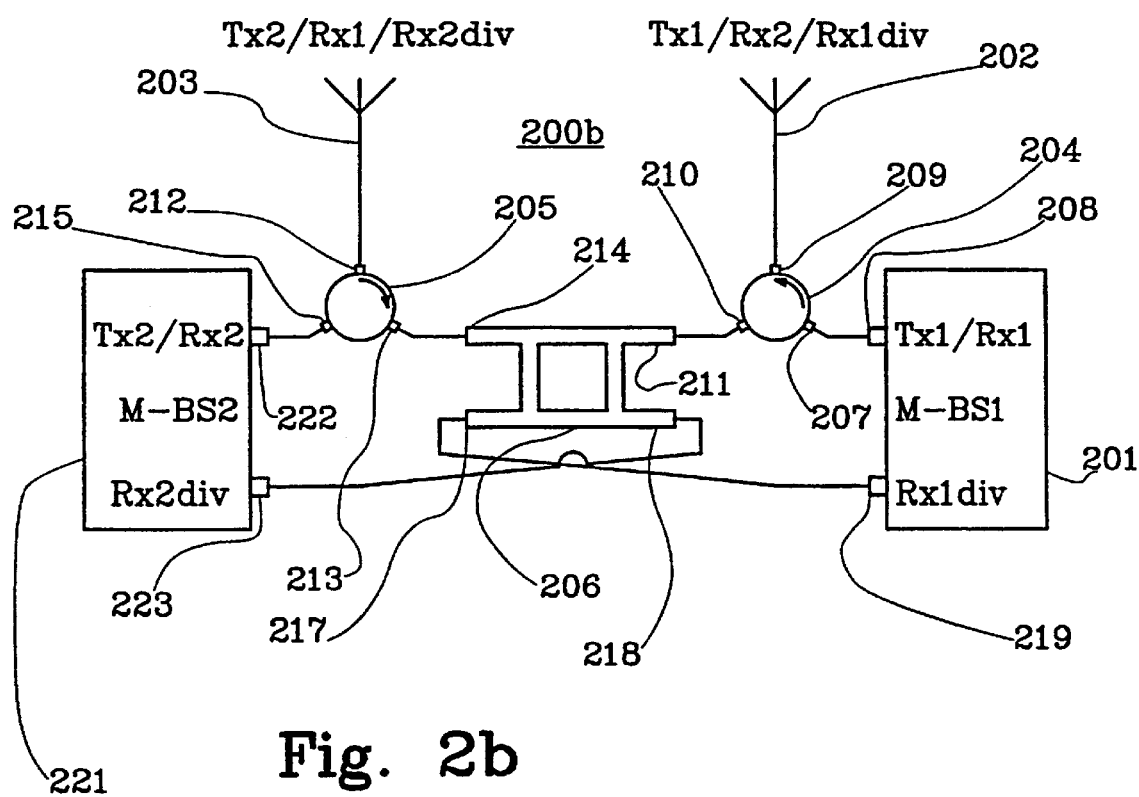
FIG. 2b illustrates, a small base station according to the invention, where two transceiver units are attached.

FIG. 2b illustrates, a small base station according to the invention, where two transceiver units 201, 221 are attached. The first transceiver unit 201, may then be the unit earlier mentioned in connection with FIG. 2a. For clarity reasons this unit is now called the main transceiver unit. A second transceiver unit 221, which may be called the auxiliary transceiver unit, is now also applied to the system.

These transceiver units may be of the same or of different types. If, for instance, the main transceiver 201 unit is adapted for voice traffic, the second transceiver 221 unit may also be adapted for voice traffic and is then used for increasing the capacity of the system. It may, however, also be adapted for packet data transmission, thus adding new services to the system. This is particularly useful in systems where voice and packet data traffic are handled separately by the mobile system.

When an auxiliary transceiver unit 221 is connected to an arrangement according to the invention, a first port 222, which is a duplex port, is connected to the third port 215 of the second circulator 205. A second port 223, which is a receiver port, is connected to the fourth port 218 of the splitter unit 206. The resistive elements 216, 220 shown in FIG. 2a are disconnected from their respective ports 215, 218.

The signal energy that was terminated in the resistive elements 216, 220 of FIG. 2a is now instead inputted at the receiver ports of the auxiliary transceiver 221. In addition, the auxiliary transceiver unit may transmit signals that are outputted at its duplex port 222. These signals are inputted at the third port 215 of the second circulator 205 and are thus outputted at the first port 212 of this circulator 205 to the second antenna 203. In this case thus, both antennas 202, 203 operate as duplex antennas.

In a preferred embodiment the splitter unit 206 is devised to split energy unevenly. Then, for example, when a signal is inputted to the first port 211 of the splitter a larger part of the energy is outputted at the second port 214 than at the third port 217. This is used to compensate for the attenuation that will affect the signal, outputted at the second port 214, when passing through the second circulator 205. Preferably the splitter unit 206 is thus designed so that signal strength is equal at the third port 217 of the splitter unit 206 and at the third port 215 of the second circulator unit 205. This should then apply in the same manner to signals inputted at the second port 214 of the splitter unit 206.

Although the present invention and its advantages have been described in detail, it should be understood that various changes, substitutions and alterations can be made therein without departing from the spirit and scope of the invention as defined by the appended claims.

What is claimed is:

1. A base station arrangement for connecting a first antenna and a second antenna to a first port, intended for transmitting and receiving radio frequency signals, and a second port, intended for receiving radio frequency signals, of a transceiver unit, comprising:

a first circulator unit, a second circulator unit and a four port splitter unit, said first circulator unit having a first port connected to the first port of the transceiver unit, a second port connected to the first antenna and a third port connected to a first port of the splitter unit; said first circulator unit being designed so that signals inputted at its first port are outputted at its second port only, signals are inputted at its second port are outputted at its third port only, and signals inputted at its third port are outputted at its first port only;

said second circulator having a first port connected to the second antenna and a second port connected a to second port of the splitter unit and a third port; said second circulator being designed so that signals inputted at its first port are outputted at its second port only, signals inputted at its second port are outputted at its third port only, and signals inputted at its third port are outputted at its first port only;

said splitter unit having a third port connected to said second port of the transceiver unit;

said splitter unit being designed so that signals inputted at its first port are outputted at its second and third ports, and that signals inputted at its second port are outputted at its first and fourth ports.

2. An arrangement claimed in claim 1, futher comprising:

a first matched resistor element connected to the fourth port of the splitter unit and a second matched resistor element connected to the third port of the second circulator.

3. An arrangement claimed in claim 1, further comprising:

an auxiliary transceiver unit having a first port, intended for transmitting and receiving radio frequency signals, connected to the third port of the second circulator, and a second port intended for receiving radio frequency signals, connected to the fourth port of the splitter unit.

4. An arrangement claimed in claim 3, wherein the splitter unit is designed to split signals incoming at its second port unevenly in a degree compensating for the attenuation between two circular ports.

5. An arrangement claimed in claim 3, wherein one transceiver unit is adapted for voice traffic and the other for packet data traffic.

6. An arrangement claimed in claim 3, wherein the splitter unit is a microstrip branchline splitter.

* * * * *